United States Patent
Patel et al.

(10) Patent No.: US 11,509,562 B1
(45) Date of Patent: Nov. 22, 2022

(54) SYSTEM AND METHOD FOR A SYSTEM LEVEL DATA SHARDING ANALYSIS OF INFORMATION HANDLING SYSTEMS

(71) Applicant: Dell Products L.P., Round Rock, TX (US)

(72) Inventors: Bhavesh Govindbhai Patel, Austin, TX (US); John S. Harwood, Boston, MA (US)

(73) Assignee: Dell Products L.P., Hopkinton, MA (US)

(*) Notice: Subject to any disclaimer, the term of this patent is extended or adjusted under 35 U.S.C. 154(b) by 0 days.

(21) Appl. No.: 17/562,807

(22) Filed: Dec. 27, 2021

(51) Int. Cl.
 G06F 15/173 (2006.01)
 H04L 43/12 (2022.01)
 H04L 67/1097 (2022.01)

(52) U.S. Cl.
 CPC .......... *H04L 43/12* (2013.01); *H04L 67/1097* (2013.01)

(58) Field of Classification Search
 CPC ........................... H04L 43/12; H04L 67/1097

USPC ........................................ 709/223, 224, 226
See application file for complete search history.

(56) References Cited

U.S. PATENT DOCUMENTS

| | | | |
|---|---|---|---|
| 2004/0230764 A1* | 11/2004 | Merchant | G06F 3/061 711/173 |
| 2016/0359872 A1* | 12/2016 | Yadav | H04L 63/20 |
| 2018/0276632 A1* | 9/2018 | Gandevia | G06Q 30/08 |
| 2018/0285951 A1* | 10/2018 | Borovikov | G06Q 30/0619 |
| 2020/0250163 A1* | 8/2020 | Kuimelis | G06F 16/2255 |

* cited by examiner

*Primary Examiner* — Liang Che A Wang
(74) *Attorney, Agent, or Firm* — Chamberlain, Hrdlicka, White, Williams & Aughtry

(57) ABSTRACT

A system for managing storage of data in a information handling systems includes a first information handling system, and a specialized information handling system comprising an enhanced networking interface, wherein the enhanced networking interface is programmed to: obtain data to be processed by the system, perform a data sharding analysis using telemetry data to identify the first information handling system, and transmit the data to the first information handling system based on the identifying.

18 Claims, 10 Drawing Sheets

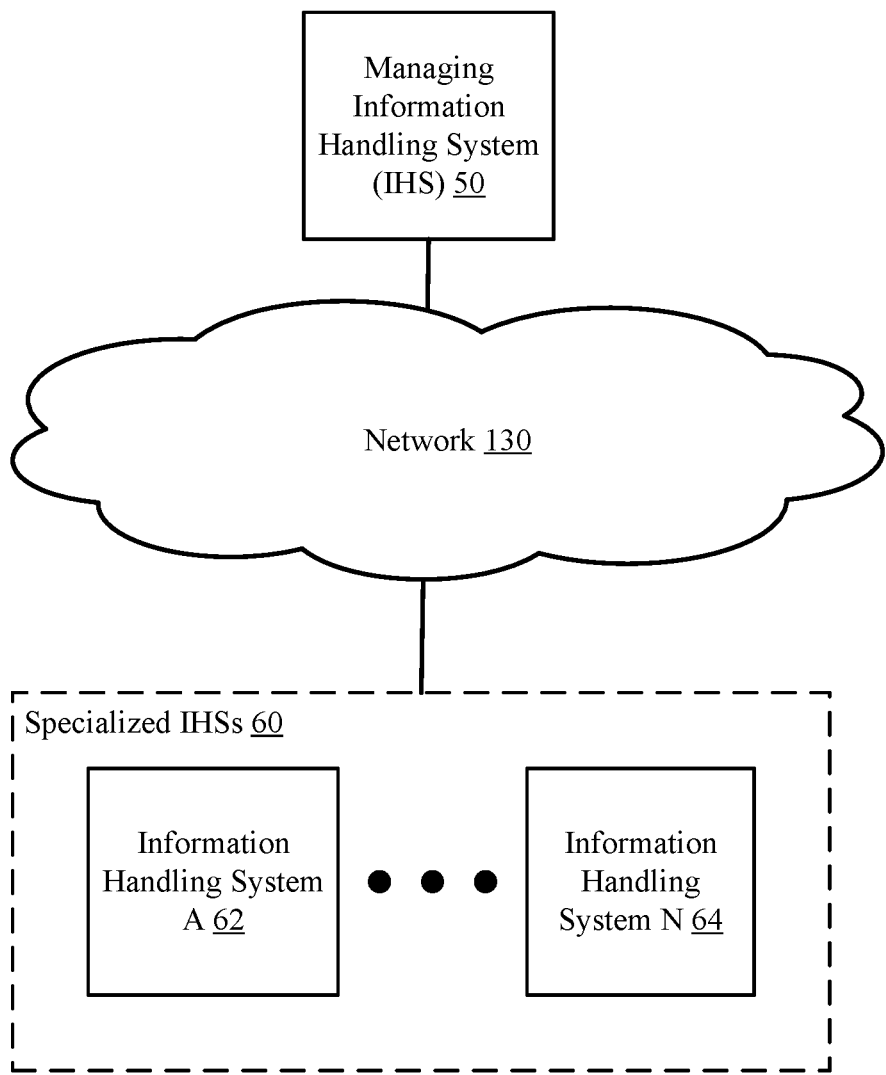
FIG. 1.1

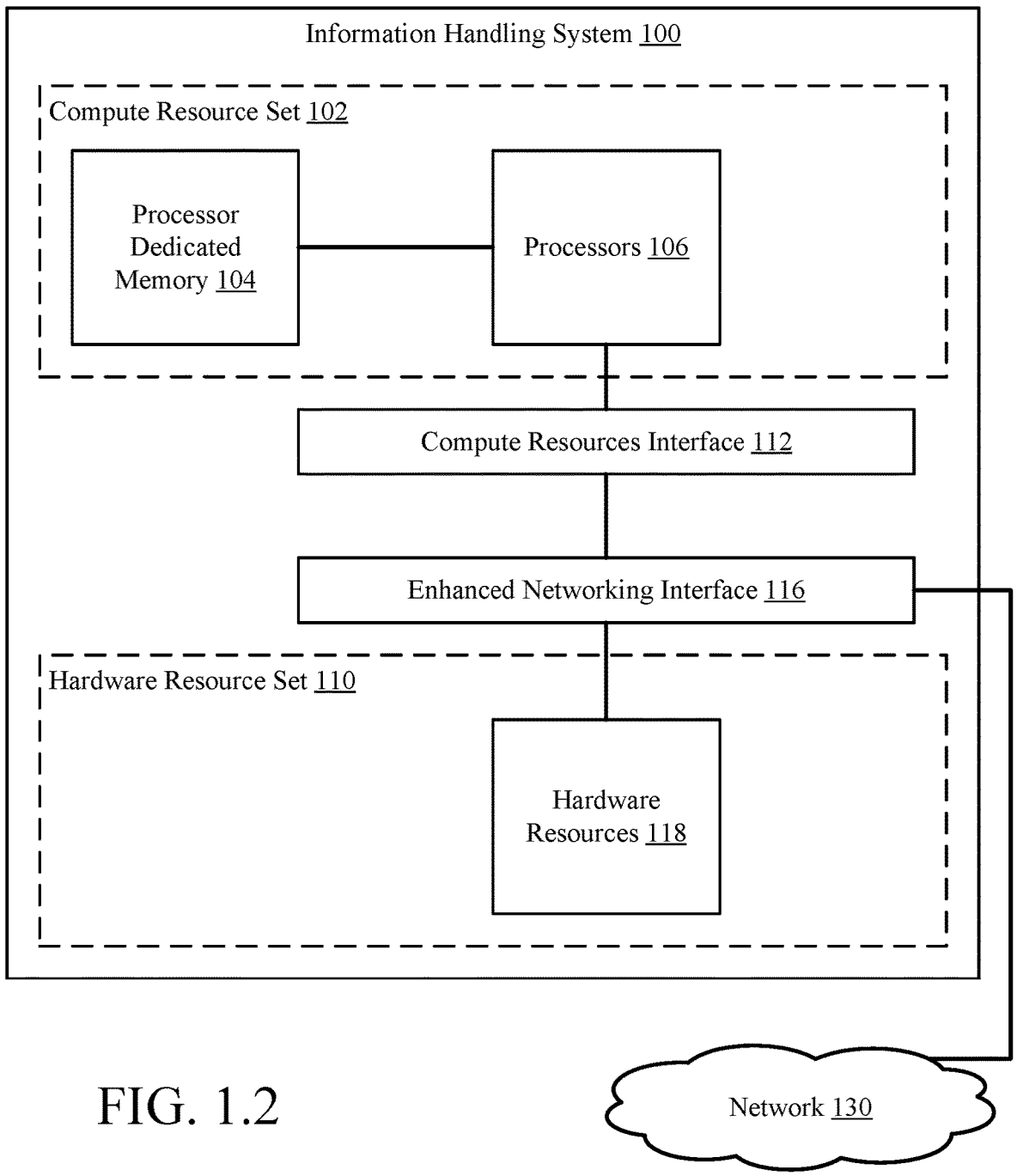
FIG. 1.2

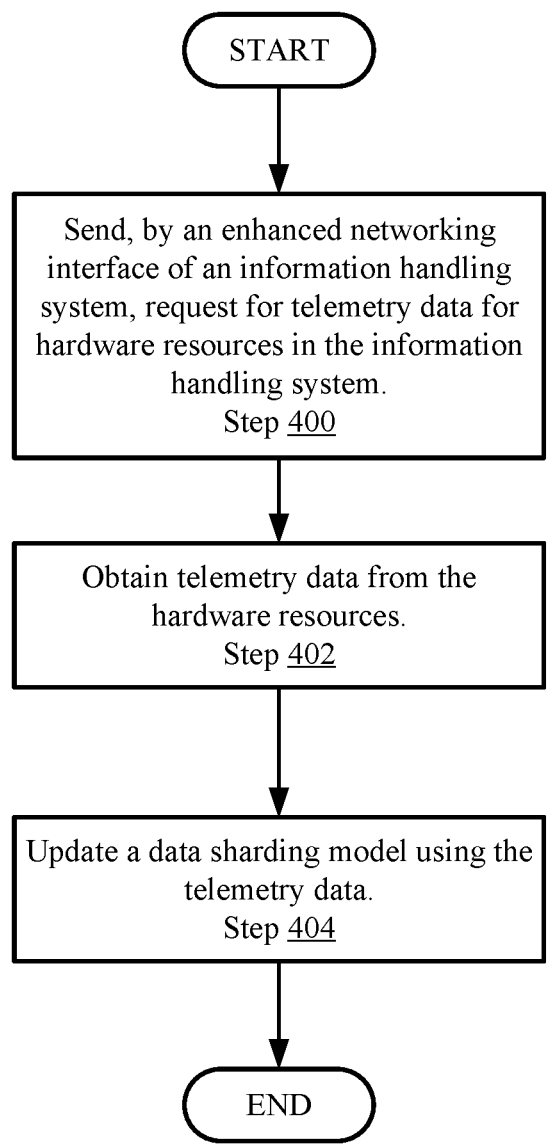
FIG. 4.1

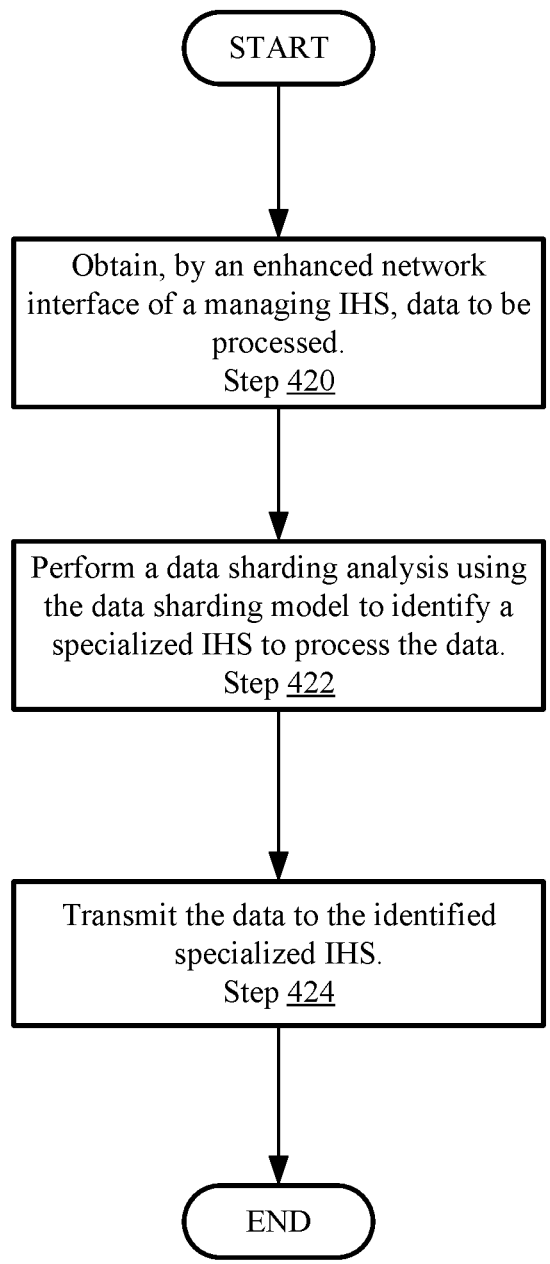
FIG. 4.2

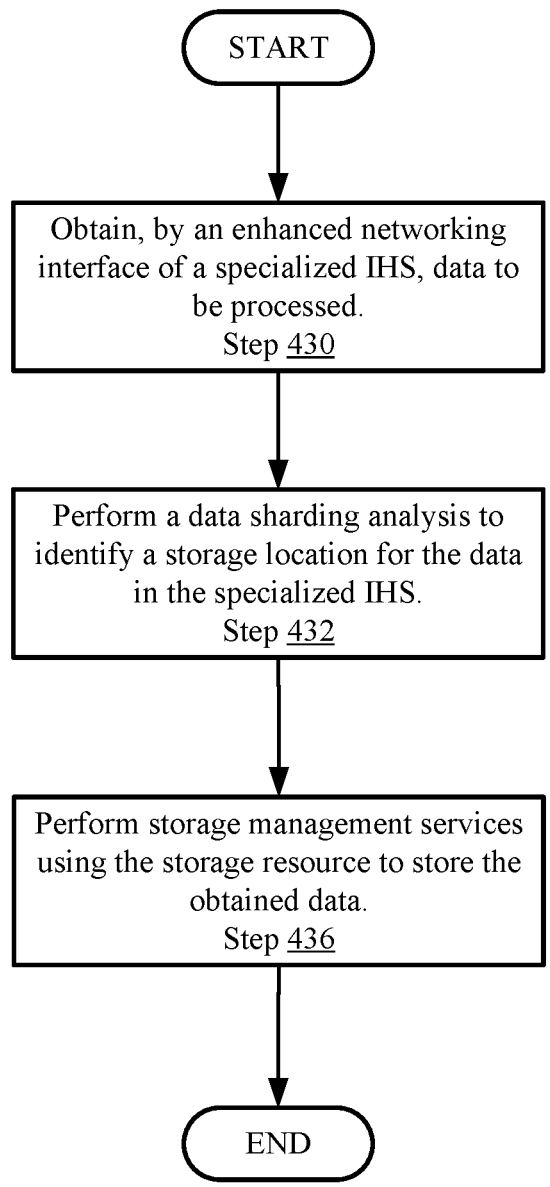
FIG. 4.3

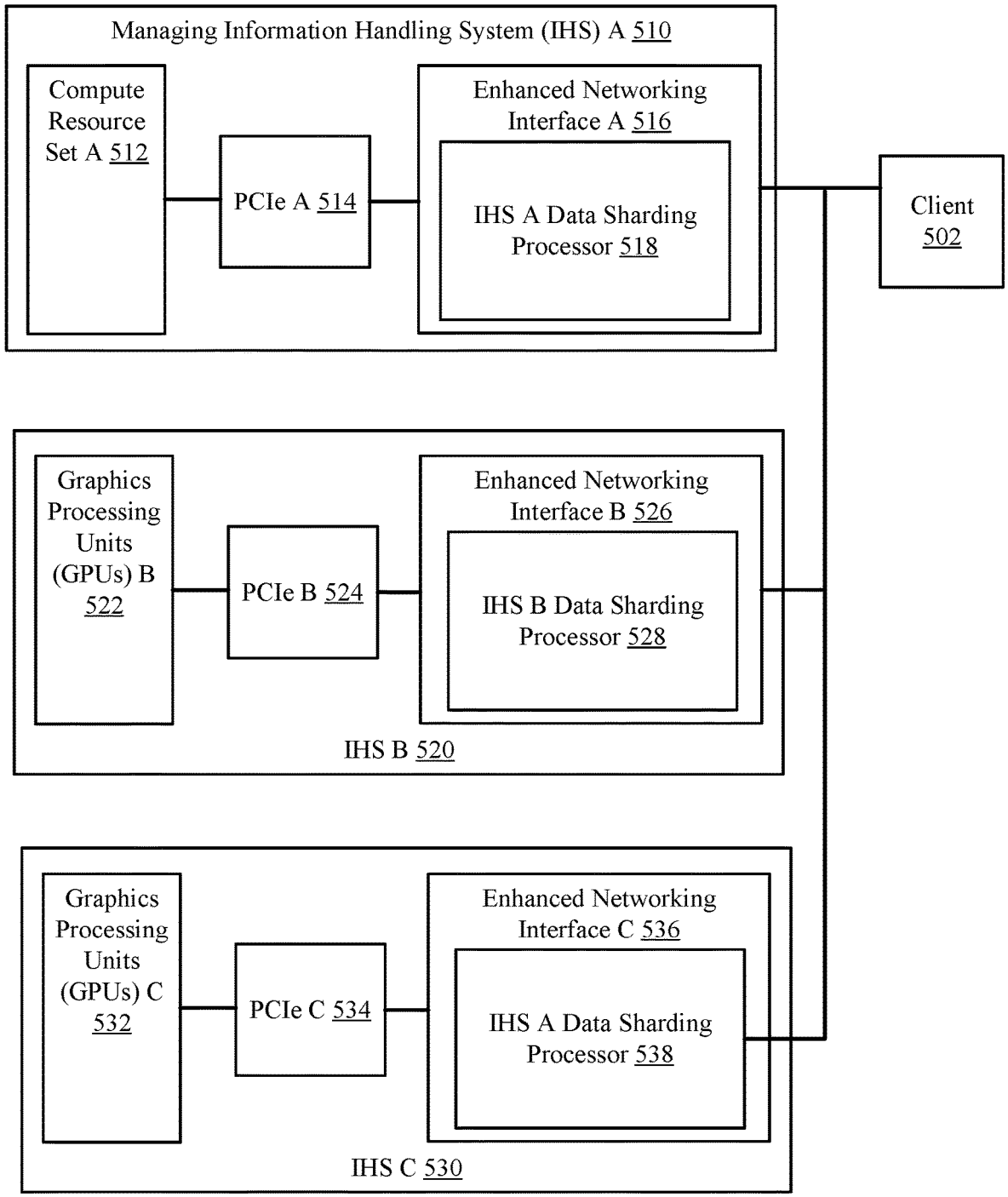
FIG. 5.1

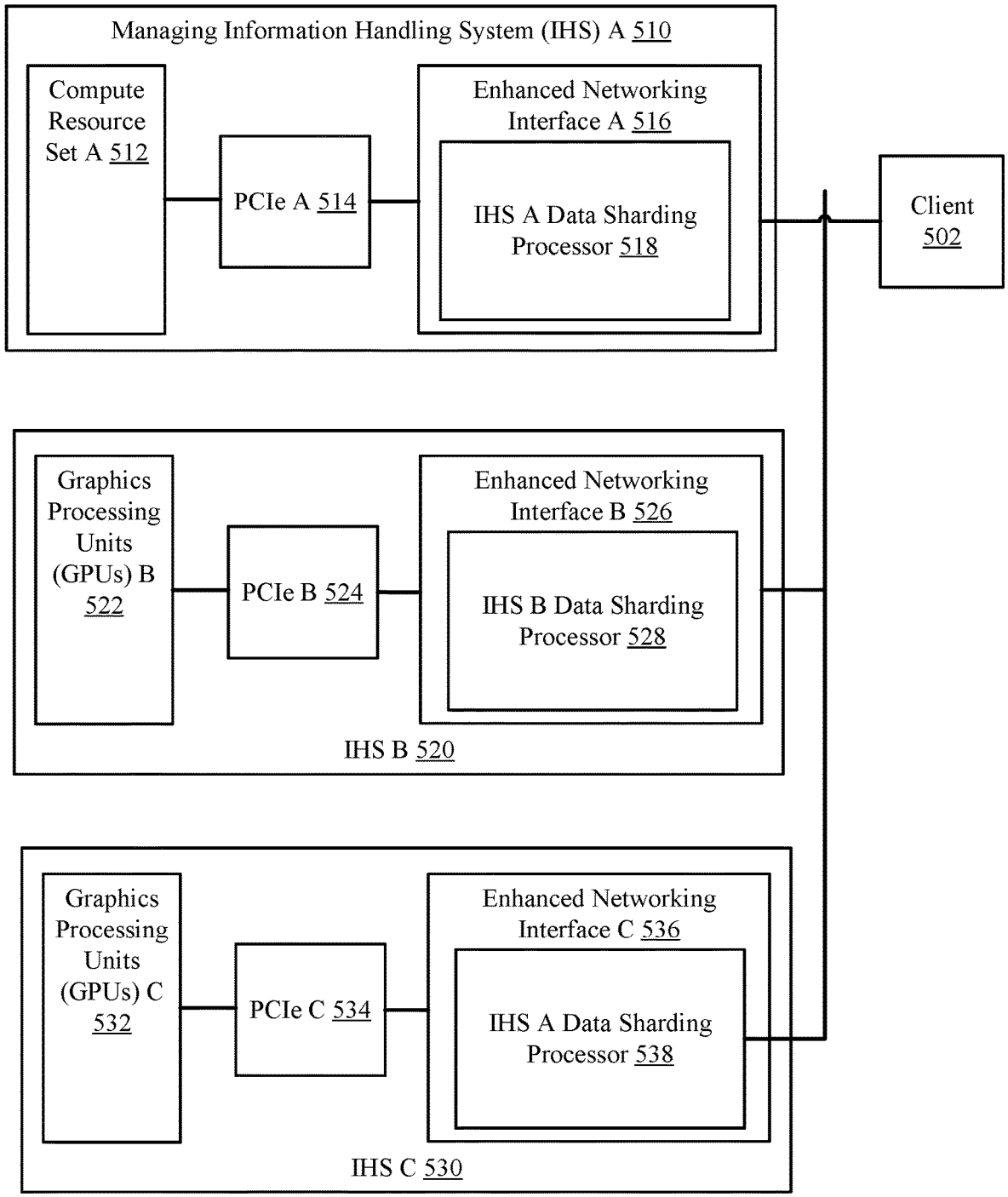
FIG. 5.2

SYSTEM AND METHOD FOR A SYSTEM LEVEL DATA SHARDING ANALYSIS OF INFORMATION HANDLING SYSTEMS

BACKGROUND

Computing devices may provide services. To provide the services, the computing devices may include hardware components and software components. The services provided by the computing devices may be limited by these components.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an information handling system in accordance with one or more embodiments of the invention.

FIG. 4.1 shows a flowchart of a method of managing a data sharding model in accordance with one or more embodiments of the invention.

FIG. 4.2 shows a flowchart of a method of performing a data sharding at a system level in accordance with one or more embodiments of the invention.

FIG. 4.3 shows a flowchart of a method of performing a data sharding at a local level in accordance with one or more embodiments of the invention.

FIGS. 5.1-5.2 shows diagrams of the operation of an example system over time in accordance with one or more embodiments of the invention.

DETAILED DESCRIPTION

Figure 2:
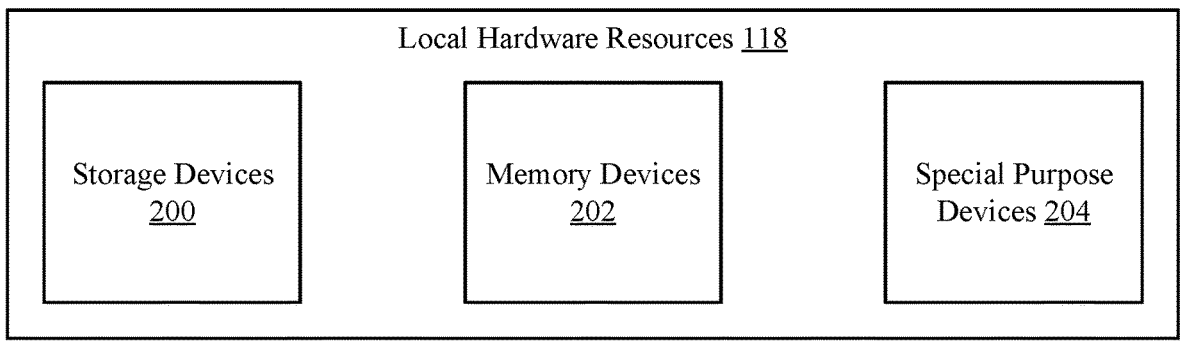
FIG. 2 shows a diagram of local hardware resources in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for performing storage management directed at preferentially writing data to storage resources that are capable of storing the data. To provide storage management services, computing resources may need to be allocated for the performance of the services. The resources may include, for example, processing resources applied to an enhanced networking interface. The processing resources may include implementing a data sharding model to identify a storage location of obtained data to be processed. The data sharding model utilizes telemetry data obtained for memory devices (or other storage devices). The telemetry data may specify the availability, capability, and proximity of the memory and/or storage devices to the processing components of a computing device. The data sharding model may identify an optimal storage location of data for efficient processing of the data by one of the processing components of the computing device.

Embodiments further relate to systems, methods, and devices for implementing a management information handling system (IHS) that utilizes, by an enhanced networking interface of the managing IHS, a data sharding model that includes telemetry data for each memory and/or storage device of multiple IHSS in the system. The managing IHS may identify the IHS that is most optimal for obtaining the data and transmit the data to the identified IHS. The communication between the managing IHS and the identified IHS may be performed using a top of rack (TOR) switch that provides high-speed communication between the IHSS in the system.

FIG. 1.1 shows a system in accordance with one or more embodiments of the invention. The system may include any number of specialized information handling systems (60). The specialized information handling systems (60) (also referred to as information handling systems or IHSS) may provide computer implemented services. The computer implemented services may include, for example, database services, data storage services, electronic communications services, data protection services, and/or other types of services that may be implemented using information handling systems.

The information handling system of the system of FIG. 1.1 may operate independently and/or cooperatively to provide the computer implemented services. For example, a single information handling system (e.g., 22) may provide a computer implemented service on its own (i.e., independently) while multiple other information handling systems (e.g., 62, 64) may provide a second computer implemented service cooperatively (e.g., each of the multiple other information handling systems may provide similar and or different services that form the cooperatively provided service).

To provide computer implemented services, the information handling systems (60) may utilize computing resources provided by hardware devices. The computing resources may include, for example, processing resources, storage resources, memory resources, graphics processing resources, communications resources, and/or other types of resources provided by the hardware devices. Various hardware devices may provide these computing resources.

Performing the computer implemented services may result in the generation of data. The data may be may be important to the system and/or a user or the system and may be required to be stored for protection and/or restoration purposes. The data may be stored for other and/or additional purposes without departing from the invention. Storing the data in the hardware devices of the system may be problematic because hardware devices may be unavailable or incapable of storing the data, resulting in inefficiencies in storing data in composed information handling systems.

In one or more embodiments of the invention, the system includes a managing information handling system (50). The managing information handling system (50) may provide data management services. The data management services may include obtaining data to be processed and identifying an optimal storage location on which the data may be stored or processed. The optimal storage location may be determined based on, for example: (i) the expected usage of the data, (ii) a proximity of the data to the hardware resources that are expected to utilize, or otherwise process, the data, and (iii) availability of the storage resources. Other factors may be considered for determining the optimal storage location without departing from the invention.

While the information handling systems (60) have been illustrated and described as including a limited number of specific components, an information handling system in accordance with embodiments of the invention may include additional, fewer, and/or different components without departing from the invention.

Turning to FIG. 1.2, FIG. 1.2 shows a diagram of an information handling system (100) in accordance with one or more embodiments of the invention. Any of the information handling systems (e.g., 60, 50) of FIG. 1.1 may be similar to the information handling system (100) illustrated in FIG. 1.2.

As discussed above, the information handling system (100) may provide any quantity and type of computer implemented services. To provide the computer implemented services, resources of the information handling system may be used to instantiate one or more composed information handling systems. The composed information handling systems may provide the computer implemented services.

To provide computer implemented services, the information handling system (100) may include any number and type of hardware devices including, for example, one or more processors (106), any quantity and type of processor dedicated memory (104), and any number of hardware resources (118). These hardware devices may be logically divided into resource sets including a compute resource set (102) and a hardware resource set (110).

The compute resource set (102) may include one or more processors (106) operably connected to the processor dedicated memory (104). Consequently, the compute resource set (102) may host any number of executing processes thereby enabling any number and type of workloads to be performed. When performing the workloads, the compute resource set (102) may utilize computing resources provided by the hardware resource set (110) of the information handling system (100), hardware resource sets of other information handling systems, and/or external resources.

The processors (106) of the compute resource set (102) may be operably connected to the hardware resource set (110). For example, the processors (106) may be connected to a compute resource interface (112), which is also connected to the hardware resource set (110).

For example, the hardware resource set (110) may include hardware resources (118) operably connected to the system control processors (114) via an enhanced networking interface (116). The hardware resources (118) may include any number and type of hardware devices that provide computing resources. For additional details regarding the hardware resources (118), refer to FIG. 2.

In another example, the system control processors (114) may be operably connected to other hardware resource sets of other information handling systems via an enhanced networking interface (116), network (130), and/or other processors of the other information handling systems. The other processors may cooperatively enable hardware resource sets of other information handling systems to be prepared and presented as bare metal resources to the compute resource set (120).

In an additional example, the processors (106) may be operably connected to external resources (e.g., other information handling systems) via the enhanced networking interface (116) and network (130). The system control processors (114) may prepare and present the external resources as bare metal resources to the compute resource set (120).

In one or more embodiments of the invention, the enhanced networking interface (116) includes functionality for distributing the storage of data between the hardware resources (118), the processors (106), and the processor dedicated memory (104). For example, the enhanced networking interface (116) may implement data sharding. In one or more embodiments of the invention, data sharding refers to the process of breaking up obtained data into logical portions of data and distributing the storage of the logical portions of the data among multiple storage locations in the information handling system (100) and/or among other devices (e.g., other specialized information handling systems in the system). The data sharding may be performed in accordance with FIGS. 4.2-4.3.

Further, the enhanced networking interface (116) may include functionality for obtaining telemetry data corresponding to the resources (e.g., the hardware resource set (102) and/or the compute resource set (110)). The telemetry data may include reading the registers of the storage and/or memory devices to identify available storage capacity, reading the registers to identify completed tasks by the processors accessing the data from the storage or memory devices. The telemetry data may be used to generate and/or update a data sharding model (further discussed in FIG. 3).

The compute resources interface (112) may be implemented using any suitable interconnection technology including, for example, system buses such as compute express links or other interconnection protocols. For example, the compute resources interface (112) may be implemented as a peripheral component interconnect express (PCIe) device. The compute resources interface (112) may support any input/output (IO) protocol, any memory protocol, any coherence interface, etc. The compute resources interface (112) may support processor to device connections, processor to memory connections, and/or other types of connections. The compute resources interface (112) may be implemented using one or more hardware devices including circuitry adapted to provide the functionality of the compute resources interface (112).

The enhanced networking interface (116) may be implemented using any suitable interconnection technology including, for example, system buses such as compute express links or other interconnection protocols. The enhanced networking interface (116) may support any input/output (IO) protocol, any memory protocol, any coherence interface, etc. The hardware resources interface (116) may support processor to device connections, processor to memory connections, and/or other types of connections. The enhanced networking interface (116) may be implemented using one or more hardware devices including circuitry adapted to provide the functionality of the hardware resources interface (116).

Figure 3:
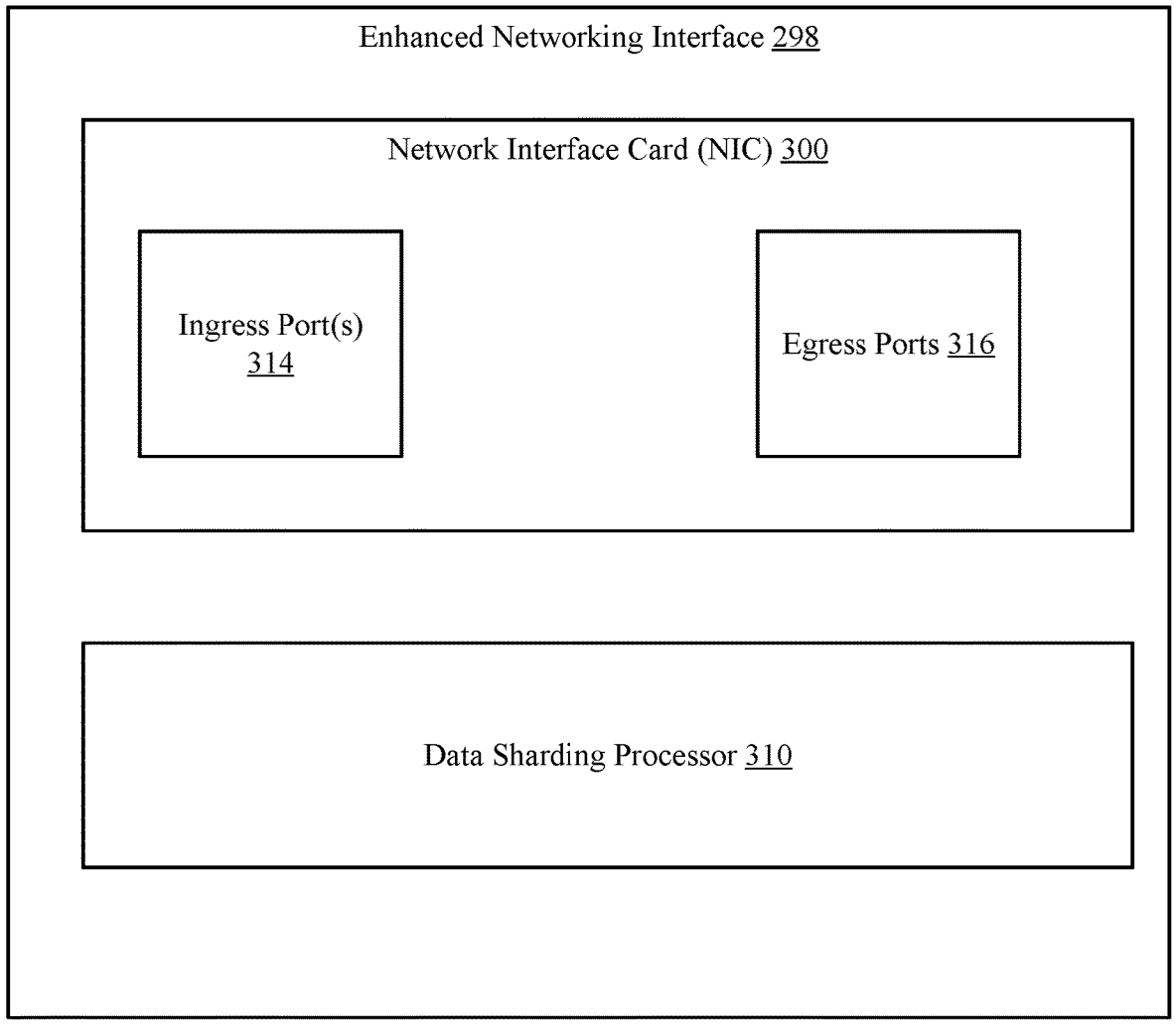
FIG. 3 shows a diagram of an enhanced networking interface in accordance with one or more embodiments of the invention.

For additional details regarding the enhanced networking interface, refer to FIG. 3.

In some embodiments of the invention, the compute resource set (120) and/or hardware resource set (110) may be implemented as separate physical devices. In such a scenario, the compute resources interface (112) and/or the enhanced networking interface (116) may include one or more networks enabling these resource sets to communicate with one another. Consequently, any of these resource sets (e.g., 102, 110) may include network interface controllers or other devices to enable the hardware devices of the respective resource sets to communicate with each other.

The network (130) may correspond to any type of network and may be operably connected to the Internet or other networks thereby enabling the information handling system (100) to communicate with any number and type of other devices (e.g., other information handling systems).

The information handling system (100) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the information handling system (100) described in this application and/or all, or a portion, of the methods illustrated in FIGS. 4.1-4.3. The information handling system (100) may be implemented using other types of computing devices without departing from the invention. For additional details regarding computing devices, refer to FIG. 6.

While the information handling system (100) has been illustrated and described as including a limited number of specific components, an information handling system in accordance with embodiments of the invention may include additional, fewer, and/or different components without departing from the invention.

Turning to FIG. 2, FIG. 2 shows a diagram the hardware resources (118) in accordance with one or more embodiments of the invention. As noted above, system control processors of information handling system may present resources including, for example, some of the hardware resources (118) to form a composed information handling system.

The hardware resources (118) may include any number and types of hardware devices that may provide any quantity and type of computing resources. For example, the hardware resources (118) may include storage devices (200), memory devices (202), and special purpose devices (204).

The storage devices (200) may provide storage resources (e.g., persistent storage) in which applications hosted by a composed information handling system may store data including any type and quantity of information. The enhanced networking interface or other entities may perform preferential writes of data to the storage devices (200). In other words, the most capable storage device or storage resource of the storage devices (200) may be used to store the data. The storage devices (200) may include any type and quantity of devices for storing data. The devices may include, for example, hard disk drives, solid state drives, tape drives, etc. The storage devices (200) may include other types of devices for providing storages resources without departing from the invention. For example, the storage devices (200) may include controllers (e.g., redundant array of disk controllers), load balancers, and/or other types of devices.

The memory devices (202) may provide memory resources (e.g., transitory and/or persistent storage) in which an information handling system may store data including any type and quantity of information. The memory devices (202) may include any type and quantity of devices for storing data. The devices may include, for example, transitory memory such as random access memory, persistent memory such as enterprise class memory or non-volatile memory express (NVMe) devices, etc. The memory devices (202) may include other types of devices for providing memory resources without departing from the invention. For example, the storage devices (200) may include controllers (e.g., replication managers), load balancers, and/or other types of devices.

The special purpose devices (204) may provide other types of computing resources (e.g., graphics processing resources, computation acceleration resources, etc.) to composed information handling systems. The special purpose devices (204) may include any type and quantity of devices for providing other types of computing resources. The special purpose devices (204) may include, for example, graphics processing units (GPUs) for providing graphics processing resources, compute accelerators for accelerating corresponding workloads performed by composed information handling systems, application specific integrated circuits (ASICs) for performing other functionalities, digital signal processors for facilitating high speed communications, etc. The special purpose devices (204) may include other types of devices for providing other types of computing resources without departing from the invention.

In one or more embodiments of the invention, the storage management services include performing preferential writes of data directed toward the logical hardware resources (118) to storage resources most capable of storing the data. The enhanced networking interfaces may obtain storage requests from computing resources indicating writes of data. In response to obtaining the storage requests, the enhanced networking interfaces may storage information associated with the storage resources of the composed information handling systems from system control processors. The storage information may be obtained from the telemetry data discussed above. The enhanced networking interfaces may identify the most capable storage resource, i.e., the storage resource that includes the necessary storage space and that may store the data the fastest. The enhanced networking interfaces may prefer to write data to local storage resource over remote storage resources due the improved speed and efficiency of writing data to a local storage resource. The storage management services may include other types of storage management services such as deduplication, erasure coding, compression, and other and/or additional services without departing from the invention.

The manner of operation of these devices i.e., the performance of the aforementioned storage management services, may be transparent to at least a portion of the computing resource sets utilizing these hardware devices for providing computer implemented services. Consequently, even though at least a portion of the resulting composed information handling system control plane may be unaware of the implementation of these models, the composed information handling systems may still operate in accordance with these models thereby managing the storage of data for composed information handling systems.

While the hardware resources (118) have been illustrated and described as including a limited number of specific components, local hardware resources in accordance with embodiments of the invention may include additional, fewer, and/or different components without departing from the invention.

As discussed above, information handling systems may include enhanced networking interfaces that obtain data to be processed, and perform data sharding to manage the storage of the data. FIG. 3 shows a diagram of an enhanced networking interface (298) in accordance with one or more embodiments of the invention. Any of the enhanced networking interfaces included in FIG. 1.2 may be similar to the enhanced networking interface (298) illustrated in FIG. 3.

The enhanced networking interface (298) may facilitate storage management services. By doing so, a system that includes information handling systems may dynamically store data among multiple storage locations based on the requirements of the data and the availability of the storage locations.

To facilitate the storage management services, the enhanced networking interface (298) may include a network interface controller (300), which includes ingress ports (314) and egress ports (316), and a data sharding processor (310). Each of these components of the enhanced networking interface (298) is discussed below.

The network interface controller (300) may be a device for providing connection between the information handling system and the network as discussed above. The network interface controller (300) may utilize the electronic circuitry required to provide the communication using any data link layer such as, for example, ethernet or Wi-Fi. The network interface controller (300) may include ingress ports (314) from which data is obtained and egress ports (316) from which data (or portions of data) is transmitted to other devices.

In one or more embodiments, the enhanced networking interface (298) further includes a data sharding processor (310). The data sharding processor (310) may include functionality for applying a data sharding model to obtained data to output identified storage locations for the data. The storage locations may be local to the information handling system of the enhanced networking interface (298) and/or external to the information handling system without departing from the invention. The data sharding model may be applied in accordance with FIGS. 4.1-4.3.

In one or more embodiments of the invention, the data sharding processor (310) may be programmed to provide storage management services for information handling systems. The storage management services may include (i) obtaining storage requests from compute resources of the compute resources sets of composed information handling system executing applications that generate data, (ii) requesting and obtaining storage information associated with storage resources of hardware resource sets of composed information handling systems, (iii) identifying storage resources that are most capable of servicing storage requests, and (iv) writing data to the identified storage resources to service storage requests. The storage resources may be local storage resources (i.e., storage devices included in the same information handling system) and/or remote storage resources (i.e., storage devices included in a different information handling system or external resource operably connected to the data sharding processor (310)). The storage management services may include other and/or additional services without departing from the invention. The data sharding processor (310) may perform all, or a portion of, the method of FIGS. 4.1-4.3.

In one or more embodiments of the invention, a data sharding processor (310) is implemented using a processor adapted to execute computing code stored on a persistent storage that when executed by the processor performs the functionality of the data sharding processor (310). The processor may be a hardware processor including circuitry such as, for example, an advanced reduced instruction set computer (RISC) machine (ARM) processor or a microcontroller. The processor may be other types of hardware devices for processing digital information without departing from the invention.

As discussed above, the system of FIG. 1.1 may provide computer implemented services using composed information handling systems. FIGS. 5.1 shows a method that may be performed by components of the system of FIG. 1.1 to manage composed information handling systems.

FIG. 4.1 shows a flowchart of a method of managing a data sharding model in accordance with one or more embodiments of the invention. FIG. 4.1 shows a flowchart of a method in accordance with one or more embodiments of the invention. The method depicted in FIG. 4.1 may be performed to manage a data sharding model in accordance with one or more embodiments of the invention. The method shown in FIG. 4.1 may be performed by, for example, an enhanced networking interface (e.g., 116, FIG. 1.2). Other components of the system in FIGS. 1.1-1.2 may perform all, or a portion of, the method of FIG. 4.1 without departing from the invention.

While FIG. 4.1 is illustrated as a series of steps, any of the steps may be omitted, performed in a different order, additional steps may be included, and/or any or all of the steps may be performed in a parallel and/or partially overlapping manner without departing from the invention.

In step 400, an enhanced networking interface of an information handling system sends a request for telemetry data associated with hardware resources in the information handling system. In one or more embodiments of the invention, the request specifies obtaining information regarding the usage and availability of the hardware resources in the information handling system. Further, the request specifies obtaining proximity of each of the hardware resources to the processing components of the information handling system. For example, the telemetry data may specify a latency between a GPU driven memory device and a GPU in the information handling system. The telemetry data may further specify a capacity of the GPU driven memory device and its usage in the last hour. Further, the telemetry data may specify the current storage of data and the usage of the data for processing to identify whether data is heavily stored or heavily processed.

In step 402, telemetry data is obtained from the hardware resources. In one or more embodiments of the invention, the telemetry data specifies information regarding the usage of data in the hardware resources (e.g., a rate of processing and/or a storage size), an availability of storage in the hardware resources, and/or a proximity of each of the hardware resources to the processing components (e.g., processors, graphics processing resources, etc.).

In step 404, a data sharding model is updated using the obtained telemetry data. In one or more embodiments of the invention, the data sharding model is updated to specify a mapping between data characteristics of obtained data and a hardware resource. As such, the data sharding model may take data characteristics of obtained data and output a hardware resource to which the data is to be stored.

The method may end following step 404.

Using the method illustrated in FIG. 4.1, a data sharding model is generated and/or otherwise updated by the enhanced networking interface. The data sharding model may be used by the enhanced networking interface to perform data sharding in accordance with FIGS. 4.2-4.3.

FIG. 4.2 shows a flowchart of a method of managing a data sharding model in accordance with one or more embodiments of the invention. FIG. 4.2 shows a flowchart of a method in accordance with one or more embodiments of the invention. The method depicted in FIG. 4.2 may be performed to perform a data sharding at a system level in accordance with one or more embodiments of the invention. The method shown in FIG. 4.2 may be performed by, for example, an enhanced networking interface (e.g., 116, FIG. 1.2) of a managing information handling system (e.g., 50, FIG. 1.1). Other components of the system in FIGS. 1.1-1.2 may perform all, or a portion, of the method of FIG. 4.2 without departing from the invention.

While FIG. 4.2 is illustrated as a series of steps, any of the steps may be omitted, performed in a different order, additional steps may be included, and/or any or all of the steps may be performed in a parallel and/or partially overlapping manner without departing from the invention.

In step 420, data to be processed is obtained. In one or more embodiments of the invention, the data is obtained from a client utilizing the resources of the system that includes the information handling systems. For example, the client may be executing an application, and the application may request to process the data in the system. The managing information handling system may obtain the data as a storage request, as a write request, as a processing request, and/or as data to be stored.

In step 422, a data sharding analysis is performed on the data using the data sharding model to identify a specialized IHS to process the data. In one or more embodiments of the invention, the data sharding analysis includes applying the data sharding model to the obtained data (and/or data characteristics of the data as obtained from the request) to output a set of one or more specialized IHSS that may store and/or process portions of the data.

In step 424, the data is transmitted to the identified IHS(s). For example, the managing information handling system may generate instructions associated with a portion of data, encapsulate the instructions and portion of data in a message, and send the message to one or more enhanced networking interfaces of the set of specialized IHSS. In response to receiving the message, the enhanced networking interfaces may implement the instructions in accordance with FIG. 4.3.

The method may end following step 424.

Using the method illustrated in FIG. 4.2, the managing information handling system obtains data to be processed and identifies, at a system level, the optimal storage locations to store the data. During the identification, the data may be divided into portions, and each portion may be processed in accordance with FIG. 4.2 to determine a storage location for each portion.

FIG. 4.3 shows a flowchart of a method in accordance with one or more embodiments of the invention. The method depicted in FIG. 4.3 may be performed to perform a data sharding at a local level in accordance with one or more embodiments of the invention. The method shown in FIG. 4.3 may be performed by, for example, an enhanced networking interface (e.g., 116, FIG. 1.2) of a specialized information handling system (e.g., 62, 64, FIG. 1.1). Other components of the system in FIGS. 1.1-1.2 may perform all, or a portion, of the method of FIG. 4.3 without departing from the invention.

While FIG. 4.3 is illustrated as a series of steps, any of the steps may be omitted, performed in a different order, additional steps may be included, and/or any or all of the steps may be performed in a parallel and/or partially overlapping manner without departing from the invention.

In step 440, data to be processed in the information handling system is obtained. The data may be obtained based on a message sent by a managing information handling system, as discussed in FIG. 4.2. The message may include the data to be stored in a storage resource of the at least one hardware resource set in the information handling system. The data may be obtained via other and/or additional methods without departing from the invention.

In step 442, a data sharding analysis is performed on the data using the data sharding model to identify a specialized IHS to process the data. In one or more embodiments of the invention, similar to step 422 of FIG. 4.2, the data sharding analysis includes applying the data sharding model to the obtained data (and/or data characteristics of the data as obtained from the request) to output a set of hardware resources in the information handling system that may store portions of the data.

In step 444, storage management services are performed using storage resources of the information handling system to store the obtained data. In one or more embodiments of the invention, a storage resource of the at least one hardware resource set is identified using the storage information. As discussed above, the storage information may specify the availability and utilization of each storage resource of the hardware resource set. The enhanced networking interface may compare the storage information associated with each storage resource with the data associated with the storage request to identify the storage resource that is best capable of servicing the storage. A storage resource of the at least one hardware resource set may be identified using the storage information via other and/or additional methods without departing from the invention.

In one or more embodiments of the invention, the enhanced networking interface writes the data associated with the storage request to the identified storage resource. The target agent may use address tables and/or other resources included in the storage information obtained from the system control processor to write the data to the storage resource. As a result, the data may be stored in the identified storage resource of the hardware resource set of the information handling system. Storage management services may be performed using the storage resource to service the storage request via other and/or additional methods without departing from the invention.

The method may end following step 444.

Using the method illustrated in FIG. 4.3, storage management services may be performed for an information handling system. The storage management services may be transparent to at least a portion of the applications executing on the compute resource set of the information handling system. Consequently, the storage management services provided by the enhanced networking device to enable preferential writes of data to storage resources most capable of storing data. Therefore, the efficiency of the performance of the information handling system may be improved, and network congestion of composed information handling systems may be reduced.

To further clarify embodiments of the invention, a non-limiting example is provided in FIGS. 5.1-5.2. FIGS. 5.1 and 5.2 shows a system similar to that illustrated in FIG. 1.1. For the sake of brevity, only a limited number of components of the system of FIG. 1.1 is illustrated in FIGS. 5.1 and 5.2.

Example

Consider a scenario as illustrated in FIG. 5.1 in which a client (602) is in communication with a system of three information handing systems that include a managing IHS A (510), IHS B (520), and IHS C (530). Each IHS (510, 520, 530) may include PCIe devices (i.e., PCIe A (514), PCIe B (524), PCIe C (534)) that communicate with their respective resources. Further, IHS A (510) includes an enhanced networking interface A (516) that includes IHS A data sharding processor (518). IHS B (520) includes an enhanced networking interface B (526) that includes IHS B data sharding processor (528). IHS C (538) includes an enhanced networking interface C (536) that includes IHS C data sharding processor (538).

The client may utilize the services of these three IHSS (510, 520, 530) to perform a training of a dataset. Prior to sending a request for processing the data, the managing IHS A (510) obtains telemetry data corresponding to the resource utilization and availability of IHS B (520) and IHS C (530). The telemetry data specifies the usage of the resources in each of the IHSS (510, 520, 530). Specifically, the telemetry data specifies the usage of the compute resource set A (512) of IHS A (510), the usage of the GPUs (522, 532) of IHSS B and C (520, 530), and the proximity of the hardware resources (not shown in FIG. 5.1) of the IHSS (520, 530) to the processing resources (e.g., 512, 522, 532) of the respective IHSS (510, 520, 530). The managing IHS (510) may store telemetry data relating to all hardware resources of the three IHSS (510, 520, 530). In contrast, IHS B (520) and IHS C (530) include telemetry data relating to their respective local resources.

After obtaining the respective telemetry data, each IHS (510, 520, 530) generates a data sharding model. The data sharding model is unique to each IHS (510, 520, 530) in that it provides an output based on its unique capabilities. IHS A (510) provides a system-wide storage location identification. In contrast, IHS B (520) and IHS C (530) each provide local level storage location identifications corresponding to their own local resources.

At a later point in time, the client sends a request to train the data set. The request may be sent to a data sharding processor (518) of IHS A (510). IHS A data sharding processor (518) obtains the request and performs the method of FIG. 4.2 to identify the type of data associated with the training dataset specified in the request. Based on the method, IHS A data sharding processor (518) determines that IHS B (520) has the available storage capability and resource proximity to the GPUs (522). Based on this determination, IHS A data sharding processor (518) transmits the data to enhanced networking interface B (526) of IHS B (520).

FIG. 5.2 shows a diagram of IHS B (520). Additional resources of IHS B (520) are illustrated in FIG. 5.2 such as a CPU (540), a CPU memory device (542) that has a high proximity to the CPU (540). Further, a GPU memory device (544) of IHS B (520) has a high proximity to the GPUs (522). The data sharding model is configured to output an identifier of the GPU memory device (544) for the input data characteristics based on the proximity of GPU memory device (544) to the GPUs (522), the availability of the GPU memory device (544), and the intended use of the data (i.e., for training). Based on the output, IHS B data sharding processor (528) initiates a storage of the data on GPU memory device (544).

End of Example

Thus, as illustrated in FIGS. 5.1-5.2, embodiments of the invention may provide a system that enables efficient data storage in information handling systems via preferentially writing data to storage resources that are able to service write requests.

Figure 6:
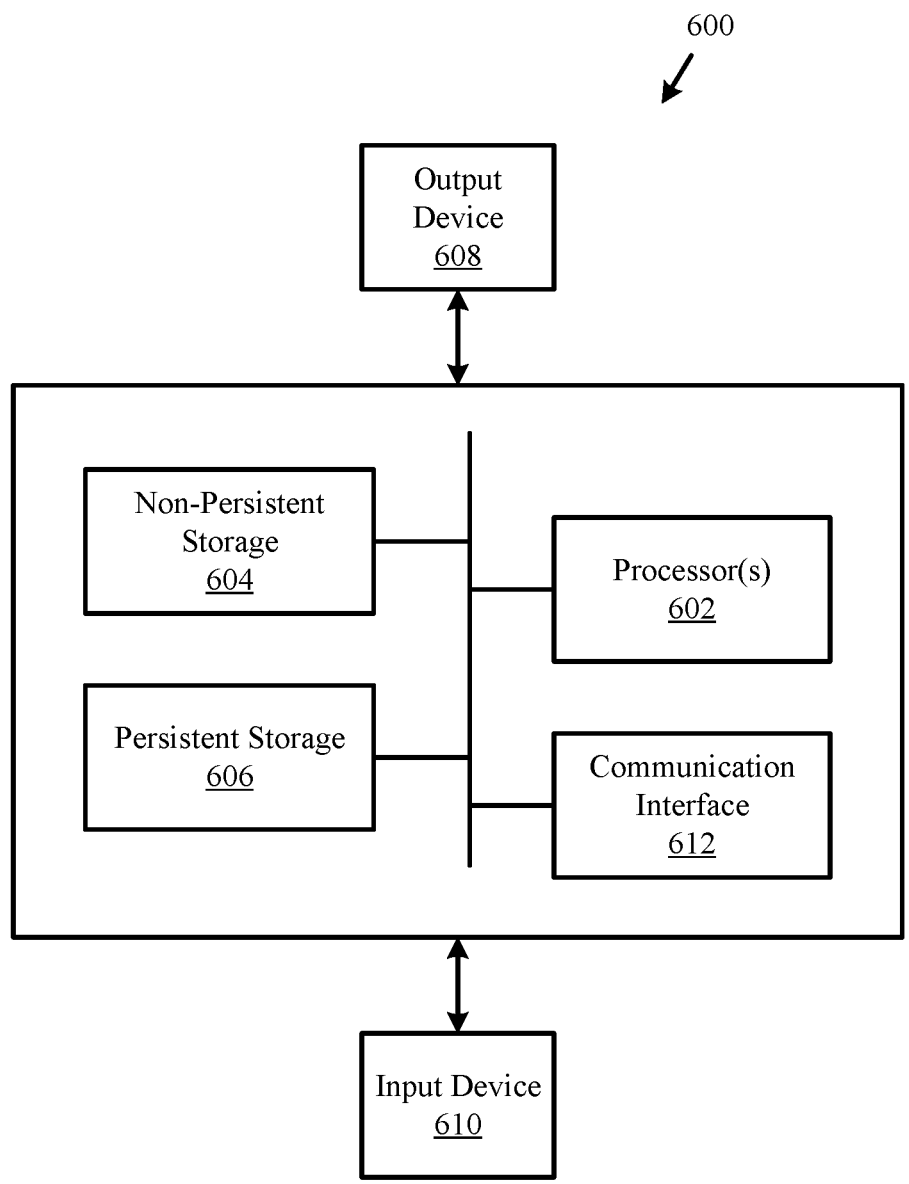
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments of the invention may provide a system and method for performing storage management services for composed information handling systems. Specifically, embodiments of the invention may provide storage management services using enhanced networking interfaces that have a lower processing capability than, for example, central processing units of the information handling systems without interrupting and/or hindering the performance of computer implemented services provided by the compute resource set and entities executing on the compute resource set.

Storage management services performed by enhanced networking interface may include performing preferential writes of data to storage resources that are most capable of efficiently storing the data. The enhanced networking interfaces may apply a data sharding model to identify storage resources of the hardware resource set of information handling systems that are most capable of storing application data associated with storage requests using storage information. Embodiments of the invention therefore allows for data to be stored in storage resources that are most capable of storing the data, resulting in the elimination of redundant network hopping, reducing network congestion and the network requirements to store data in a composed information handling system.

Thus, embodiments of the invention may address the problem of inefficient use of computing resources to store data in a composed information handling system by performing storage management services for composed systems. For example, by utilizing a managing information handling system to setup, during the instantiation of a composed information handling system, a system control processor and a target agent to perform storage management services, the storage management services may be efficiently performed for the composed information handling system using the system control processor and the target agents.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A system for managing storage of data in information handling systems, comprising:
    a first information handling system, wherein the first information handling system comprises:
        a second enhanced networking interface;
        a first processor comprising a first memory device; and
        a second processor comprising a second memory device; and
    a specialized information handling system comprising an enhanced networking interface, wherein the enhanced networking interface is programmed to:
        obtain data to be processed by the system;
        perform a data sharding analysis using telemetry data to identify the first information handling system, wherein the data sharding analysis is based on the usage of the data, an availability of the first memory device and the second memory device, and a proximity of the second memory device to the second processor; and
        transmit the data to the first information handling system based on the identifying, and
    wherein the second enhanced networking interface is programmed to:
        obtain the data from the specialized information handling system;
        perform a second data sharding analysis to identify the second memory device; and
        store, based on the identifying, the data in the second memory device.

2. The system of claim 1, wherein the enhanced network interface comprises:
    a data sharding processor configured to perform the data sharding analysis.

3. The system of claim 2, wherein the specialized information handling system further comprises a processor, wherein the data sharding processor has a lower processing capability than the processor.

4. The system of claim 1, wherein the specialized information handling system is further programmed to:
    obtain the telemetry data from the first information handling system; and
    based on the telemetry data, generate a data sharding model, wherein the data sharding analysis is performed based on the data sharding model.

5. The system of claim 1, wherein the second processor is a graphics processing unit (GPU).

6. The system of claim 1, wherein the first memory device is a non-volatile memory express (NVMe) storage device.

7. The system of claim 1, wherein the system further comprises:
    a top of rack (TOR) switch,
    wherein the data is transmitted to the first information handling system via the TOR switch.

8. A method for managing storage of data in information handling systems, comprising:
    obtaining, by an enhanced networking interface of a specialized information handling system, data to be processed;
    performing a data sharding analysis using telemetry data to identify a second information handling system to store the data, the second information handling system comprising:
        a second enhanced networking interface;
        a first processor comprising a first memory device; and
        a second processor comprising a second memory device;
    wherein the telemetry data is associated with information corresponding to the second information handling system, and wherein the data sharding analysis is based on the usage of the data, an availability of the first memory device and the second memory device, and a proximity of the second memory device to the second processor; and
    transmitting the data to the second information handling system based on the data sharding analysis; and
    wherein the second enhanced networking interface is programmed to:

obtain the data from the specialized information handling system;

perform a second data sharding analysis to identify the second memory device; and store, based on the identifying, the data in the second memory device.

9. The method of claim 8, wherein the enhanced networking interface has a lower processing capability than a processor of the specialized information handling system.

10. The method of claim 8, further comprising:

obtaining the telemetry data from the second information handling system; and based on the telemetry data, generating a data sharding model, wherein the data sharding analysis is performed based on the data sharding model.

11. The method of claim 8, further comprising:

obtaining, by a second enhanced networking interface of the second information handling system, the data to be processed;

performing, by the second enhanced networking interface, to determine storing data on a memory device of the second information handling system; and storing the data in the memory device.

12. The method of claim 11, wherein the memory device is a non-volatile memory express (NVMe) device.

13. The method of claim 8, wherein the data is transmitted from the specialized information handling system to the second information handling system via a top of rack (TOR) switch.

14. A non-transitory computer readable medium comprising computer readable program code, which when executed by a computer processor enables the computer processor to perform a method for managing storage of data in composed information handling systems, the method comprising:

obtaining, by an enhanced networking interface of a specialized information handling system, data to be processed;

performing a data sharding analysis using telemetry data to identify a second information handling system to store the data, the second information handling system comprising:

a second enhanced networking interface;

a first processor comprising a first memory device; and a second processor comprising a second memory device;

wherein the telemetry data is associated with information corresponding to the second information handling system, and wherein the data sharding analysis is based on the usage of the data, an availability of the first memory device and the second memory device, and a proximity of the second memory device to the second processor; and transmitting the data to the second information handling system based on the data sharding analysis; and wherein the second enhanced networking interface is programmed to:

obtain the data from the specialized information handling system;

perform a second data sharding analysis to identify the second memory device; and store, based on the identifying, the data in the second memory device.

15. The non-transitory computer readable medium of claim 14, wherein the enhanced networking interface has a lower processing capability than a processor of the specialized information handling system.

16. The non-transitory computer readable medium of claim 14, the method further comprising:

obtaining the telemetry data from the second information handling system; and based on the telemetry data, generating a data sharding model, wherein the data sharding analysis is performed based on the data sharding model.

17. The non-transitory computer readable medium of claim 14, the method further comprising:

obtaining, by a second enhanced networking interface of the second information handling system, the data to be processed;

performing, by the second enhanced networking interface, to determine storing data on a memory device of the second information handling system; and storing the data in the memory device.

18. The non-transitory computer readable medium of claim 17, wherein the data is transmitted from the specialized information handling system to the second information handling system via a top of rack (TOR) switch.

* * * * *